United States Patent [19]

Memminger et al.

[11] Patent Number: 4,673,139
[45] Date of Patent: Jun. 16, 1987

[54] TEXTILE MACHINERY YARN SUPPLY APPARATUS

[75] Inventors: Gustav Memminger, Heideweg 65, D-7290 Freudenstadt; Erich Roser, Bermatingen, both of Fed. Rep. of Germany

[73] Assignee: Gustav Memminger, Freudenstadt, Fed. Rep. of Germany

[21] Appl. No.: 759,653

[22] Filed: Jul. 26, 1985

[30] Foreign Application Priority Data

Aug. 8, 1984 [DE] Fed. Rep. of Germany ....... 3429207

[51] Int. Cl.⁴ .................. B65H 51/30; D04B 15/48; D04B 15/50
[52] U.S. Cl. .................. 242/47.01; 66/125 R; 66/132 R; 66/210; 226/24; 226/42
[58] Field of Search .............. 242/47.01; 226/42, 24, 226/10, 145, 46; 66/210–211, 212, 132 R, 125; 112/79 A

[56] References Cited

U.S. PATENT DOCUMENTS

| | | | |
|---|---|---|---|
| 2,847,763 | 8/1958 | Thomas | 226/46 X |
| 3,648,939 | 3/1972 | Rosen . | |
| 3,858,415 | 1/1975 | Wilson et al. | 66/210 |
| 3,858,416 | 1/1975 | White et al. | 66/132 R |
| 3,962,891 | 6/1976 | Rouzaud | 66/132 R |
| 4,200,212 | 4/1980 | Hartig et al. | 226/42 X |
| 4,353,227 | 10/1982 | Shields et al. | 66/146 |
| 4,436,251 | 3/1984 | Deyesso . | |

FOREIGN PATENT DOCUMENTS

| | | | |
|---|---|---|---|
| 54-25183 | 8/1979 | Japan . | |
| 56-155159 | 12/1981 | Japan . | |
| 1312803 | 4/1973 | United Kingdom | 66/210 |
| 1497279 | 1/1978 | United Kingdom . | |
| 2009261 | 6/1979 | United Kingdom . | |

Primary Examiner—Stuart S. Levy
Assistant Examiner—Lynn M. Sohacki
Attorney, Agent, or Firm—Frishauf, Holtz, Goodman & Woodward

[57] ABSTRACT

A yarn supply apparatus for yarn-using textile machinery has a rotatable yarn supply element (4) supplying yarn under slip free conditions at a predetermined tension, which is driven by a speed-controllable electric drive motor (6), the speed of which is controlled in accordance with the output signal of sensing means (7, 9) monitoring the travel speed of the yarn (11) supplied by the yarn supply element. In order to provide an apparatus which operates independently of external synchronizing means, the arrangement is such that the speed of the drive motor is synchronized with the sensing means output signal (36), which is representative of the yarn supply speed, and the sensing means (7, 9) are located at a distance behind the yarn supply element (4), as viewed in the direction of yarn travel.

20 Claims, 2 Drawing Figures

4,673,139

TEXTILE MACHINERY YARN SUPPLY APPARATUS

Reference to related application: by the inventors hereof, assigned to the assignee of the present application, U.S. application Ser. No. 06/759 662 filed July 26, 1985.

The present invention relates to textile machinery and more particularly to apparatus supplying yarn to a textile machine such as a knitting machine, weaving loom or the like. The invention is particularly applicable to knitting machines, which require supply of yarn under predetermined tension.

BACKGROUND

From U.S. Pat. No. 3,858,416, Eugene F. White and Frances H. White, a yarn supply apparatus is known, the yarn supply element of which comprises a cylindrical disc mounted on the shaft of an electric drive motor. The yarn that is to be supplied is looped several times around the circumferential surface of the disk in such a manner that slip free yarn supply is assured. An electric motor is provided as the drive motor, its speed being regulatable by varying the supply voltage, in one embodiment, and by control of the pulses supplying the motor, in another embodiment. Via the drive motor, the speed of the yarn supply disk is synchronized with the speed of the circular knitting machine equipped with this kind of yarn supply apparatus. To this end, a pulse transducer is coupled with the revolving cylinder of the circular knitting machine and emits an output signal in pulse form which is representative of the machine speed. This output signal is converted by a frequency/voltage converter into an analog voltage, which is compared with the output signal that is emitted by a tachometer generator or incremental transducer connected with the drive motor and has been converted into a corresponding voltage. By means of a regulator, when a control deviation occurs the speed of the yarn supply disk is regulated to the command value predetermined by the pulse transducer of the circular knitting machine.

In this yarn supply apparatus, in order to maintain the tension of the yarn supplied to the needles at a predetermined value, a tension sensing means, or feeler, is provided following the yarn supply disk in the direction of yarn travel. Together with a command value source, the output of the feeler can be selectively sent to the regulator input by switch actuation, and by correspondingly controlling the drive motor the regulator establishes the tension value corresponding to the predetermined command value.

In circular knitting machines operating with striping devices, it sometimes happens that the yarn supply apparatus associated with a knitting feed must supply yarns according to a pattern during one or more revolutions of the machine, and that the yarn supply is abruptly interrupted temporarily. This means that the yarn supply must be effected synchronously with the changes in the operating status of the particular stripping device. Jacquard knitting machines, as well, generally operate with a different, constantly varying yarn requirement in the individual knitting feeds, in accordance with a pattern. To supply yarn, yarn storage fournisseurs must accordingly be used, with the yarn being pulled off over-end, or over-head, from the yarn storage drum as needed. Positive yarn supply is not possible with these fournisseurs.

For all these applications, in which a highly fluctuating amount of yarn is pulled off per unit of time at the individual knitting feeds, yarn supply apparatus which must be synchronized with an external pulse source, formed for instance as a pulse transducer rigidly joined to the cylinder of a circular knitting machine, is unsuitable.

THE INVENTION

It is an object of the invention to device a yarn supply apparatus with which the amount of yarn required by a particular yarn user, e.g. a knitting feed of a knitting machine, can be independently and positively supplied at the predetermined yarn tension without being synchronized with an external clock pulse or synchronizing pulse source or with the operating speed of the machine, which may receive yarn from any one of several supply apparatus. Even at a zero ("0") yarn quantity, that is, when yarn pull-off is interrupted, the yarn tension should be maintained; this is particularly important, for instance, in the striping apparatus mentioned above. Further, the yarn supply apparatus is distinguished by its many possible applications, while being simple in design.

Briefly, the speed of a drive motor coupled to a rotatable yarn supply element, e.g. a disk or a drum, is controlled by an output signal from a yarn speed sensing means. The output signal is representative of the yarn supply speed, and the sensing means, e.g. feelers, are disposed at some distance behind the yarn supply wheel, as viewed in the direction of yarn travel.

If there is yarn removal, that is, if yarn is needed at the yarn run-out of the yarn supply apparatus, then the feelers first ascertain the occurrence of a predetermined yarn travel speed. They emit an output signal that represents the yarn travel speed. Since the drive motor of the yarn supply element is controlled by this output signal, it drives the yarn supply element at the corresponding circumferential speed, such that the yarn is supplied at the speed corresponding to the amount needed. A control loop is thus formed in which the yarn itself forms part of the loop:

The yarn supply element, supplying a yarn in slip-free manner; the yarn itself; the yarn speed sensing means or feelers; the output signal from the feelers, which controls the speed of the drive motor, which drive the yarn supply element. No external "desired" or "command" yarn speed/actual yarn speed comparator, or control by the operating speed of the utilizing machine, typically a circular knitting machine, is used.

In the case of elastic yarns, the change in yarn length that occurs behind the yarn supply element in the yarn travel direction when the yarn removal varies can be absorbed by the inherent elasticity of the yarn. If this is not sufficient, it is appropriate for a yarn reserve to be disposed on the yarn travel path between the yarn supply element and the sensing means, this reserve being provided for instance by a U-shaped loop of yarn, along the course of which the yarn is guided by corresponding diversion elements. To prevent the yarn reserve from becoming impermissibly large or small when the yarn demand varies, it is advantageous is the yarn supply apparatus has a regulator that maintains the size of the yarn reserve at a command value.

In the described embodiment, the yarn supply apparatus is capable of supplying the yarn to the user either at zero tension or at a definite predetermined tension. Various yarn tensions are frequently necessary, depending on the finished yarn quality of the goods to be produced and other factors. Thus, in a preferred embodiment, such that it has controlled tensioning devices controlling the tension of the yarn supplied by the yarn supply element, the tensioning devices being disposed on the yarn travel path between the yarn supply element and the feelers. These tensioning devices can advantageously have a yarn tension regulator that keeps the yarn tension automatically at a predetermined command value, if this should be required.

The drive motor of the yarn supply element is suitably a stepping motor, to which the output signal of the sensing means or feelers is supplied, this signal being converted as needed into a corresponding stepping pulse train and amplified. Alternatively, the arrangement may also be such that the yarn supply apparatus has a servo regulator which continuously readjusts the speed of the drive motor, which is formed particularly as a stepping motor, to the sensing means output signal, which functions as a command value.

The yarn travel speed can be measured by any appropriate method by which it is possible to obtain an output signal that represents the yarn travel speed as accurately as possible. Particularly simple conditions are attained if the feelers are formed as a low inertia measuring wheel coupled in a slip free manner with the yarn and coupled with a signal transducer. This signal transducer may be an electric generator, which emits a voltage proportional to the speed of the measuring wheel; alternatively, it may be an angle code reader, which scans the measuring wheel directly, for instance by optical means.

The above-mentioned tensioning means provided for producing the yarn tension desired at a particular time may have a tensioning element that is movable between two yarn support points, acting transversely to the yarn travel direction and loaded by an adjustable force, which may be formed as a weight, a spring force or an electromagnetically generated force.

It is also advantageous if the yarn supply apparatus has a display, supplied with the sensing means output signal, for the quantity of yarn supplied per unit of time. This display may additionally be provided with a further display for the tension of the yarn supplied, which is measured by a yarn tension measuring device. In this way, it is possible to read out the quantity of yarn supplied at the various knitting feeds of the circular knitting machine and to adjust it to a command value as needed, without requiring special measuring instruments for this purpose.

Alternatively, or in addition, the yarn supply apparatus can also have a connection device for signal lines, by way of which the output signal of the feelers and/or a signal representing the tension of the supplied yarn can be interrogated. Via this connection device, the various yarn supply devices, for instance of a multi-feed circular knitting machine, can also be connected to a central display, with which an automatic monitoring device may optionally be coupled as well; if impermissible deviations in the yarn amount supplied at individual knitting feeds occur, this monitoring device introduces a correction to the drive motor of the associated yarn supply apparatus, or even causes a stoppage of the machine.

It is also possible to use the connection device on the individual yarn supply apparatus for connecting a manual display device at regular intervals, so as to monitor the quantity and/or the tension of the yarn supplied, if the expense of a separate display device coupled with every individual yarn supply apparatus is not justified.

Set-up operations to be performed when the machine is stopped, and restarting knitting machine after a yarn breakage, become substantially easier if a reversal switch is coupled with the drive motor of the yarn supply apparatus. It is thereby possible, before restarting the machine, for any excess pulled-off yarn hanging limply down to be rewound, so as to assure that the yarns at the individual knitting feeds will immediately have the established tension.

In an advantageous embodiment, a tension feeler can be coupled with the drive motor, so that if the yarn tension drops below a predetermined threshold and the yarn supply is interrupted, that is, when the knitting machine is stopped, this tension feeler will emit a signal that reverses the drive motor, causing the drive motor to drive the yarn supply element in the direction for yarn rewinding, until the predetermined yarn tension value is attained. After a yarn breakage or after the yarn has been tied together again, the necessary yarn tension is automatically reestablished in this manner. The feeler arm of the yarn run-in or run-out shutoff device can then be manually moved over to a special position, in which rewinding is possible.

As already noted, the novel yarn supply apparatus is an independent, self-contained system, which needs no external synchronization. Structurally, it is advantageous if the yarn supply element, formed in the case of this yarn supply apparatus as a yarn supply disk or drum, is located on a common holder, together with the sensing means and the associated electrical switching elements for controlling the drive motor, so that the entire apparatus becomes a compact structural unit, which can be mounted at a suitable location on the yarn-using machine in the conventional manner.

The yarn supply apparatus can be used not only on circular knitting machines having striping devices, Jacquard machines, and the like, but also, in principle, on any yarnusing textile machinery in which it is important for yarn to be supplied to the individual yarn users at a predetermined yarn tension, either continuously or intermittently, or with a variable yarn supply quantity. It is particularly well suited to stocking-knitting machines, for which no yarn supply apparatuses that meet the requirements of these machines have been known until now. Especially in seamless stocking machines, which are used for knitting fine women's hosiery, the loop length is varied continuously in the area of the long part of the leg by raising and lowering the needle bed, causing the yarn consumption per revolution of the machine to vary continually. The novel yarn supply apparatus adjusts automatically to these requirements, without needing special control commands or machine circuitry.

Furthermore, in this yarn supply apparatus the yarn supply is positive in principle, yet on the other hand the apparatus itself is distinguished by its simple design, lacks complicated parts, and can be mounted at any arbitrary point along the yarn travel path between the spool and the yarn guide of a circular knitting machine, for example. It is easy to operate, is operational in any position, and needs no maintenance. In a changeover of the machine to another quality or another pattern, no change needs to be made in the yarn supply apparatuses. The setting and adjusting operations that was previously required can be dispensed with; as a rule, these operations were very time-consuming and could be performed only by skilled workers.

DRAWINGS

FIG. 1 is a schematic view of a yarn supply apparatus according to the invention along with the associated electrical block circuit diagram; and FIG. 2 is a side view of a practical embodiment of the yarn supply apparatus of FIG. 1.

DETAILED DESCRIPTION

Figure 1:
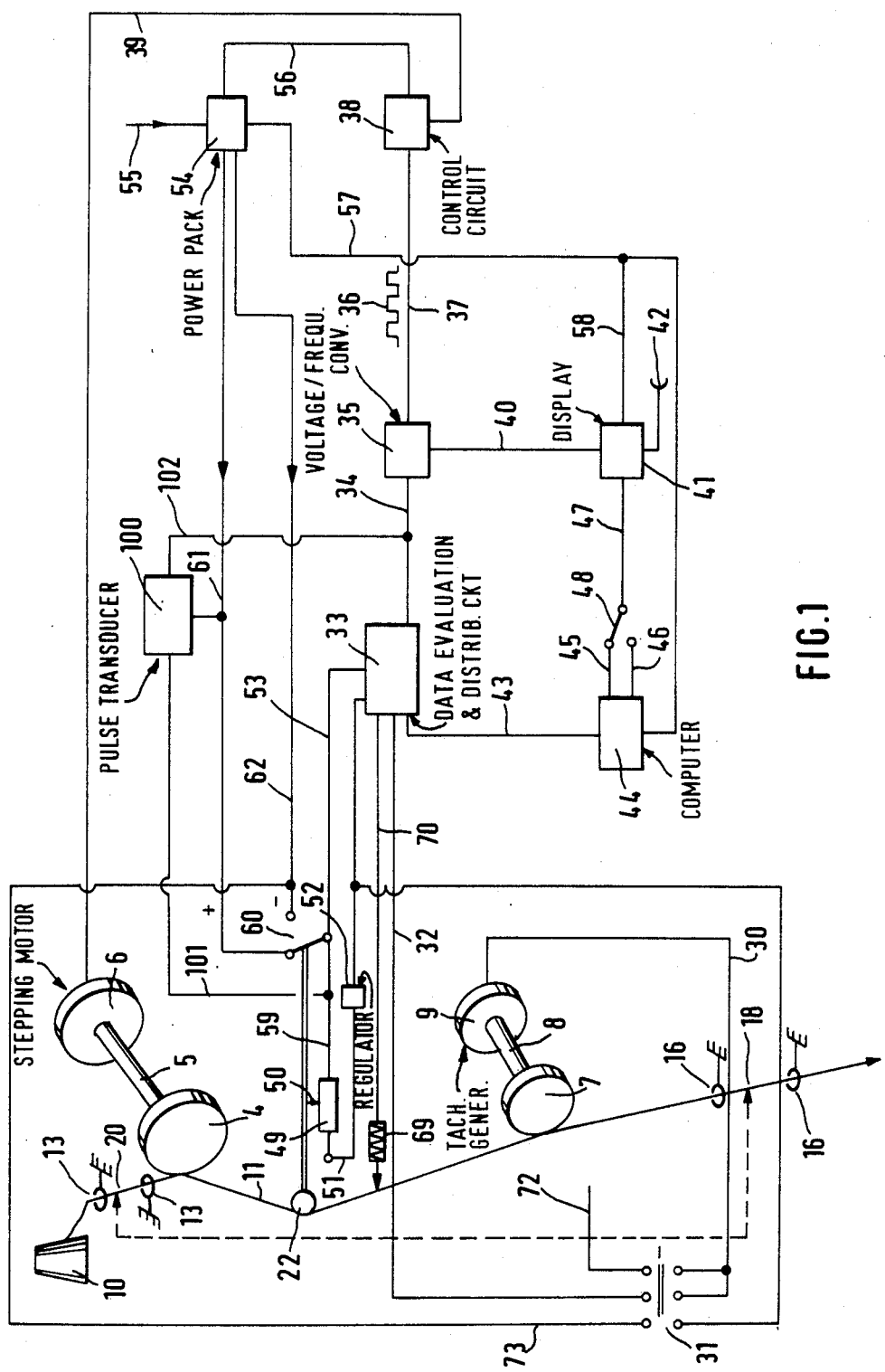

The yarn supply apparatus shown in the drawings has a housing 1 (see FIG. 2), which can be secured to a yarn-using textile machine, for instance to a frame ring of a circular knitting machine, in a known manner by means of a substantially U-shaped holder 2 and a clamping screw 3. A yarn disk or drum 4 (FIGS. 1 and 2) forming a yarn supply element is rotatably supported on the housing 1 and is mounted directly onto the shaft 5 (FIG. 1) of a stepping motor 6 in a rotationally fixed manner.

A small low inertia measuring wheel 7, forming a sensing means, or feeler, for the supply speed of the yarn being supplied, is rotatably supported axially parallel with the yarn supply disk or drum 4, on the same side of the housing, and is coupled via a shaft 8 with a tachometer generator 9 located in the housing 1. Instead of the tachometer generator 9, an angle code reader or other pulse transducer may be used.

The yarn 11 arriving from a spool shown as 10 in FIG. 1 travels via two coaxial run-in eyes 13 secured to the housing 1 by means of a bracket 12 and via an adjustable yarn brake 14 located between the run-in eyes 13 to the cirumference of the yarn supply disk or drum 4. On the cylindrical circumferential surface of the yarn supply disk or drum 4, the yarn is located in a plurality of windings one on top of the other, the number of which is such that the yarn 11 can be supplied in a slip free manner by the yarn supply disk or drum 4. From the yarn supply disk or drum 4, the yarn 11 travels to the circumferential surface of the measuring wheel 7, which is located spaced apart from the yarn supply disk or drum 4 and after it, in the direction of yarn travel indicated by an arrow 15 in FIG. 2. The yarn is likewise looped in a plurality of windings on top of one another around the cylindrical circumferential surface of the measuring wheel 7, and the number of these windings is again such that the measuring wheel 7 is coupled with the yarn in a slip free manner.

The yarn 11 that leaves the measuring wheel 7 is guided by two coaxial run-out eyes 16, which are retained on the housing 1 by means of a holder 17. Between the two run-out eyes 16, the yarn 11 that is running out is scanned by the feeler arm 18 of a run-out shutoff device accommodated in the housing. The feeler arm 18 is rotatably supported on the housing at 19. The yarn emerging from the run-out eyes 16 is delivered to a yarn consumer, not otherwise shown, such as a knitting feed of a circular knitting machine.

Monitoring of the yarn 11 that is running in is performed by a run-in shutoff device located in the housing 1, the feeler arm 21 of which, being pivotably supported at 20, scans the yarn 11 behind the second run-in eye 13, in the yarn travel direction.

In the area between the yarn supply disk or drum 4 and the measuring wheel 7, the yarn 11 travels via a yarn tensioning roller 22, which is mounted on a lever arm 23 which is pivotably supported on the housing 1 at 24 and is joined to a second lever arm 25, which in the operating position is substantially horizontal and on which a weight 26 is mounted in a longitudinally displaceable manner.

To adjust the position of the weight 26 on the second lever arm 25 at any time, a scale 27 is used.

Figure 2:
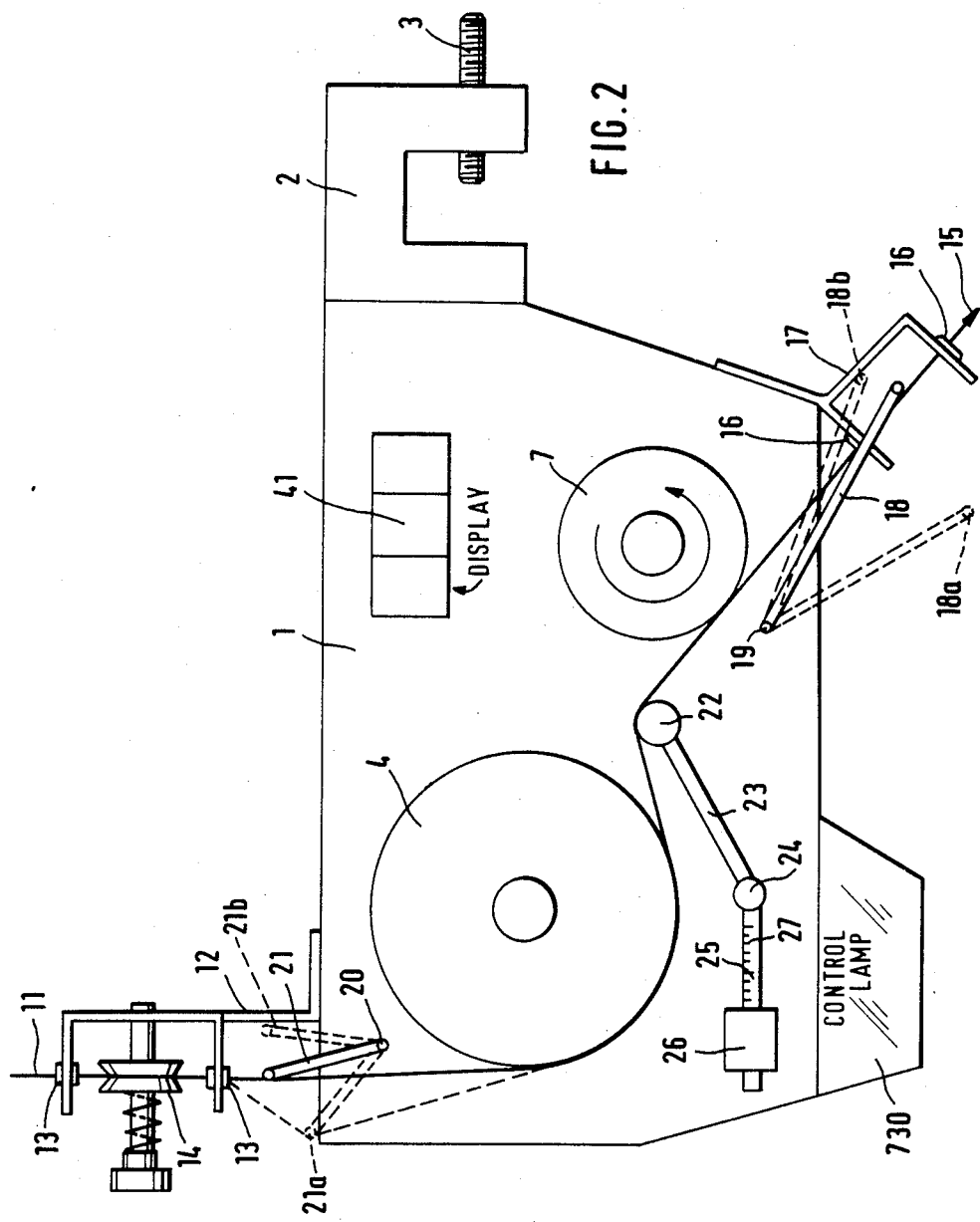

As shown in FIG. 2, in the normal operating situation the yarn tensioning roller is mounted in such a way that on its way from the circumferential surface of the yarn supply disk or drum 4 to the circumferential surface of the measuring wheel 7, the yarn 11 undergoes a deflection from the straight connecting line. By means of this deflection, a yarn reserve is formed, which in accordance with FIG. 2 can be used up by pivoting the two lever arms 23, 25 clockwise about the pivot axis 24.

As shown in FIG. 1, the tachometer generator 9 coupled with the measuring wheel 7 is equipped, via a line 30, a switch 31 the function of which will be explained below, and a line 32, with a data evaluation and distribution circuit 33, to which an output signal in the form of an analog voltage is supplied by the tachometer generator 9. This output signal is representative of the yarn travel speed.

Connected to the output side of the data evaluation and distribution circuit 33, via a line 34, is a voltage/frequency converter 35, which converts the analog output signal of the tachometer generator 9, which may have been amplified in the data evaluation and distribution circuit 33, into a pulse train the pulse frequency of which is representative of the yarn travel speed. This pulse output signal 36 is supplied via a line 37 to a control circuit 38, which on the output side is connected via a line 39 to the stepping motor 6.

Connected to the voltage/frequency converter 35 via a line 40 is a display device in the form of a display 41, to which the pulse output signal 36 of the tachometer generator 9, which represents the yarn travel speed, is accordingly delivered, and which digitally displays the value of the yarn travel speed at any given time. This display is provided on one side of the housing 1, as shown in FIG. 2.

A coupling device, in the form of a plug device 42, for external signal lines is connected through the display device 41 to line 40, to be supplied by the the voltage/frequency converter 35 with the pulse output signal of the tachometer generator 9; it is thereby possible to evaluate this signal outside the yarn supply apparatus as well, which will be explained in detail further below.

A computer 44 is connected via a line 43 with the data evaluation and distribution circuit 33 or optionally with the voltage/frequency converter 35; the computer 44 makes it possible to store and/or monitor data supplied via the line 43 and to emit an output signal that is representative of the given data, or of the results of monitoring, to a line 47 leading to the display 41, so that the corresponding data can be displayed there. A selector switch 48 located between the lines 45, 46 and 47 enables various outputs of the computer 44 to be displayed selectively.

The wiper 50 of a potentiometer, schematically shown at 49 in FIG. 1, is connected to the pivot axis 24 of the two lever arms 23, 25 (FIG. 2). This potentiometer emits a signal representing the angular position of the two lever arms 23, 25, and thus representing the location of the tensioning roller 22, via a line 51, which is connected to a regulator 52, which contains a command value transducer and is connected via a line 53 the data evaluation and distribution circuit, and eventually to the control circuit 38.

Electric current is supplied to the individual portions of the circuit by means of a power pack 54, the power supply line of which is shown at 55 and the current supply lines of which, leading to the individual parts of the circuit, are identified as 56–58.

The supply of electric current to the data evaluation and distribution circuit 33 is effected via a line 59 and a switch 60, which is mechanically coupled to the tensioning roller 22. Two supply lines 61, 62 carrying supply voltages of opposite polarity are connected to the switch 60, so that from the polarity of the supply voltage present on the line 59, the data evaluation and distribution circuit 33 can recognize the position of the switch 60.

OPERATION

Initially, it is assumed that the yarn demand of the yarn user is zero. The yarn supply apparatus assumes the position shown in FIG. 2. The yarn is under tension; the magnitude of the yarn tension is determined by the position of the weight 26 on the lever arm 25.

When the yarn user beings to remove yarn, for instance if the striping apparatus, supplied by the yarn supply apparatus of a circular knitting machine lays in the yarn, then yarn is removed via the run-out eyes 16. Thus the measuring wheel 7 is set into counterclockwise rotation, as shown in FIG. 2, and the yarn reserved formed by the yarn tensioning roller 22 is reduced or partially consumed.

Once the measuring wheel 7 begins to turn, the tachometer generator 9 emits an output signal, via the line 30, that is proportional to the yarn travel speed; this signal is delivered by the data evaluation and distribution circuit 33 to the voltage/frequency converter 35. There the analog output signal is converted into a stepping pulse signal having a corresponding stepping frequency, which is also proportional to the yarn travel speed. This pulse output signal 36 is then delivered, via the control circuit 38 and the line 39, to the stepping motor 6, which drives the yarn supply disk or drum 4 at a circumferential speed corresponding to the yarn travel speed. Each of the pulses proceeding from the electronic control circuit 38 to the stepping motor 6 can correspond to either one full angular increment, or merely a portion of the angular increment, of the stepping motor 6. It can thus be seen that a control loop is formed by:

The measuring wheel 7 and the tachometer generator 9 coupled thereto; line 30 and circuits 33, 35, 38, and line 39; motor 6 and the yarn supply disk or drum 4 coupled thereto; and the yarn 11 itself, which is coupled in slip-free manner to the disk or drum 4 and to the measuring wheel 7, the yarn closing the control loop. No external command operating speed/actual yarn operating speed comparator and associated controller is used in this loop.

At the same time, via the line 43, the computer 44 receives the data pertaining to the yarn travel speed, which is either stored in the computer or used to generate an output signal, which via the lines 45, 47 and the switch 48, which is in the position shown in FIG. 1, reaches the display 41, where it is displayed.

Regardless of how the yarn removal by the yarn user takes place chronologically, the stepping motor 6 thus drives the yarn supply disk or drum 4 at a speed associated with the quantity of yarn being supplied at that time, the magnitude of this speed being determined by the measuring wheel 7. In this manner, via the tachometer generator 9 and the stepping motor 6 as well as the circuit portions 33, 35, 38 located between them, the revolutions of the measuring wheel 7 are rigidly synchronized electrically with the stepping motor 6.

The magnitude of the tension at which the yarn is delivered to the user is determined by the position of the weight 26 on the second lever arm 25. Once yarn consumption stops, the speed of the measuring wheel 7 drops accordingly, and hence the speed of the stepping motor 6 and thus of the yarn supply disk or drum 4 is reduced as well, until the yarn supply apparatus finally comes to a stop. Even when the machine is at a stop, the yarn remains tensed at the predetermined value by means of the weighted yarn tensioning roller 22 that acts on the yarn between the yarn supply disk or drum 4 and the measuring wheel 7.

The size of the yarn reserve formed by the yarn tensioning roller 22 varies when the yarn supply speed varies. It can be kept constant via the potentiometer 49 and the regulator 52. The potentiometer 49 emits a signal via the line 51 which is representative of the position at any given time of the position of the tensioning roller 22 and thus of the size of the yarn reserve present between the yarn support points, formed where the yarn leaves the yarn supply disk or drum 4 and where the yarn arrives at the measuring wheel 7. In the regulator 52, this signal is compared electrically with a command value. The result is a signal, corresponding with the deviation, if any, connected via the lines 53, 34 and 37 to the control circuit 38, which by correspondingly varying its output variable, which is emitted via the line 39, causes the stepping motor 6 to rotate about an angular value such as to compensate for the deviation. Since the regulation is integral, the deviation disappears.

The magnitude of the yarn tension that is established can be monitored by a separate tension feeler 69 (FIG. 1), which via the line 70 emits a corresponding measurement signal to the data evaluation and distribution circuit 33, which in turn passes a corresponding datum on to the computer 44. A datum representing the yarn tension can be interrogated at the output line 46 via the switch 48 and then displayed on the display device 41.

When the machine shuts off the yarn tension of the yarn supply apparatus becomes zero ("0"), for instance because a sagging loop of yarn forms, or if it drops below a predetermined lower threshold, then the yarn tensioning roller 22 is pivoted by the weight 26 into a threshold position, in which the switch 60 coupled with the levers 23, 25 is actuated via these levers. This reversal has the result that via a control line 101, a pulse transducer 100 that emits pulses of constant pulse frequency via a line 102 is switched on, and that the data evaluation and distribution circuit 33, via the voltage/frequency converter 35, furnishes a reversal command for the stepping motor 6 to the control circuit 38. Supplied with the pulses of the pulse transducer 100, the stepping motor 6 is started in the rotational direction opposite the direction of yarn supply. Thus the yarn supply disk or drum 4 begins to rewind the hanging loop of yarn, and continues this until such time as the yarn, as it becomes tenser, again returns the yarn tensioning roller far enough toward its normal position that the switch 60 switches back into its normal position and the pulse transducer is switched off, as soon as the yarn is again in its normal position.

Instead of the weight 26, the yarn tensioning roller 22 can naturally also be loaded with an adjustable spring, an electromagnetic force, or a force generated in some other way. It is also possible for the tension feeler 69 to be combined directly with the yarn tensioning roller 22, that is, to use the yarn tensioning roller 22 itself, or the device generaating the force coupled with it, for measuring the yarn tension.

In the described embodiment, the output signal of the tachometer generator 9—after appropriate signal conversion and amplification—controls the stepping motor 6 directly. Alternatively, the synchronizing between the stepping motor 6 and the tachometer generator 9 can also be done in such a manner that the output signal of the tachometer generator 9 is used as a command value, to which a servo regulator included in the control circuit constantly regulates the speed of the stepping motor 6.

The yarn run-out and run-in shutoff devices, which with their feeler arms 18 and 21 scan the yarn 11 that is running out and in, respectively, actuate the switch 31 via their feeler arms 18 and 21 such that if the yarn breaks, on the one hand the output signal line of the tachometer generator 9 is interrupted, thus instantly stopping the stepping motor 6, and on the other hand a stop signal is sent to the machine drive via a line 72. This stoppage of the yarn supply and of the machine is effected whenever the run-out or run-in feeler bracket 18 or 21 assumes the position shown at 18*a* or 21*a*, respectively, in FIG. 2.

A third position is also associated with the run-out and/or the run-in feeler bracket 18 or 21; this position is identified in FIG. 2 as 18*b* or 21*b* and corresponds to the actuation of the left-hand pair of contacts of the switch 31 in FIG. 1. In this position, the run-out or run-in feeler bracket 18 or 21 is appropriately under spring loading, so that it can be adjusted only by intentional manual actuation. It serves to deliver a reversal signal for the stepping motor 6 to the electronic control circuit 38, via a line 73. It is thereby possible, for instance after a yarn breakage and an ensuing retying of the yarn, to make the stepping motor 6 run briefly in reverse by simply adjusting the run-out or run-in feeler bracket 18 or 21, and thus to reestablish the required operating tension on the yarn.

The coupling device 42, finally, makes it possible to supply signals representing the yarn tension and/or the yarn travel speed to a central, external display device or to a central regulating device, which establish synchronization, if necessary, between the various yarn supply apparatuses, for instance of a circular knitting machine, by controlling the electronic control circuits 38 of the individual yarn supply apparatuses. The control commands can likewise be delivered to the voltage/frequency converter 35, and thence to the electronic control circuit 38, via the coupling device 42.

As shown in FIG. 2, the entire yarn supply apparatus is in the form of a compact unit mounted in a flat, substantually rectangular housing 1, which on one of its broad sides carries the yarn supply disk or drum 4 as well as the measuring wheel 7 and display 41. A monitor lamp 730 lights up if the yarn run-in or run-out shutoff device responds, or if any other impermissible operating condition arises.

We claim:

1. Yarn supply apparatus for a knitting feed of a knitting machine having a rotatable yarn supply disk or drum (4) supplying yarn having yarn looped thereabout and supplying yarn under slip-free conditions, a speed-controllable drive motor (6) coupled to operate the yarn supply disk or drum (4) in a slip-free manner; and yarn pull-off speed sensing means (7, 9) coupled to the yarn being removed from the yarn supply disk or drum (4) by the knitting feed under slip-free conditions, at a yarn pull-off speed determined by said knitting feed, said yarn speed sensing means (7, 9) sensing speed of the yarn being removed by said knitting feed and providing a yarn speed supply signal, wherein, in accordance with the invention, the rotatable yarn supply disk or drum (4) supplies the yarn under slip-free conditions and at a predetermined tension;

the yarn speed sensing means (7, 9) are located, viewed in the direction of travel of the yarn being supplied, between the yarn supply disk or drum (4) and the knitting feed; and means (30, 31) for coupling the yarn speed supply signal to the speed controllable drive motor (6) and for controlling the speed of operation of the speed controllable drive motor in accordance with the yarn speed supply signal, and hence in accordance with the speed of the yarn being removed from the yarn supply disk or drum (4) by the knitting feed; and wherein the yarn (11), the yarn pull-off speed sensing means (7, 9), the drive motor (6) and the yarn supply disk or drum (4) coupled thereto form a closed control loop.

2. Yarn supply apparatus according to claim 1, wherein a yarn reserve is located on the yarn travel path between the yarn supply disk or drum (4) and the sensing means (7, 9).

3. Yarn supply apparatus according to claim 2, including a regulator (52) maintaining the size of the yarn reserve at a command value.

4. Yarn supply apparatus according to claim 2, including adjustable tensioning means (22, 26) to subject the tension on the yarn (11) supplied by the yarn supply disk or drum (4) to a commanded tension value, said tensioning means being located in the yarn travel path between the yarn supply disk or drum (4) and the sensing means (7, 9).

5. Yarn supply apparatus according to claim 4, including a yarn tension regulator (56) associated with the tensioning means and controllling the tensioning means for automatically maintaining the yarn tension at a predetermined command value.

6. Yarn supply apparatus according to claim 1, wherein the drive motor (6) is a stepping motor which is supplied with and controlled by the output signal of the sensing means (7, 9).

7. Yarn supply apparatus according to claim 1, including a servo regulator continuously readjusting the speed of the drive motor (6), in accordance with tye yarn speed supply signal from the sensing means (7, 9) which acts as a command value.

8. Yarn supply apparatus according to claim 1, wherein the sensing means are formed as a low inertia measuring wheel (7) which is coupled in a slip free manner with the yarn (11) and is combined with a signal transducer (9).

9. Yarn supply apparatus according to claim 4, wherein the tensioning means have a movable tensioning element (22) acting upon the yarn (11) between two yarn support points transverse to the direction of yarn travel, the tensioning element being loaded with an adjustable force (26).

10. Yarn supply apparatus according to claim 1, including a display device (41) for the quantity of yarn supplied per unit of time, the display device being supplied with the output signal of the sensing means (7, 9).

11. Yarn supply apparatus according to claim 10, wherein the display device (41) has a display for the tension of the yarn supplied, this tension being measured by means of a yarn tension measuring device (69).

12. Yarn supply apparatus according to claim 1, including a connection device (42) for signal lines, by way of which at least one of:
the output signal of the sensing means (7, 9);
a signal representative of the tension of the supplied yarn, can be interrogated.

13. Yarn supply apparatus according to claim 1, including a rotation reversal switch (60; 31) coupled with the drive motor (6).

14. Yarn supply apparatus according to claim 13, wherein a tension monitor (22, 60) is provided coupled with the drive motor (6), the tension monitor emitting a signal which reverses the drive motor (6) if the yarn tension drops below a predetermined threshold and the yarn supply is interrupted, under the influence of which signal the drive motor (6) drives the supply element (5) such as to rewind the yarn until the predetermined yarn tension threshold has been attained.

15. Yarn supply apparatus according to claim 13, wherein the rotation-reversal switch can be triggered by means of a yarn monitor including a yarn sensing element, located on at least one of:
the run-in; the run-out side,
of the yarn, the yarn sensing element (18) of the monitor being manually movable into a rewinding position (18b).

16. Yarn supply apparatus according to claim 1, including a common holder (1, 2); and
wherein the yarn supply element is in the form of a yarn supply disk or drum (4), and is located together with the sensing means (7, 9) and the associated electric switching elements for controlling the drive motor (6) on the common holder (1, 2).

17. Yarn supply apparatus according to claim 6, wherein the output signal is converted into a corresponding stepping motor control pulse train, and amplified.

18. Yarn supply apparatus according to claim 1, wherein the knitting machine comprises a circular knitting machine.

19. Yarn supply apparatus according to claim 18, including means forming a yarn reserve, positioned in the yarn travel path between said yarn supply element (4) and the yarn pull-off speed sensing means (7, 9);
and a regulator (52), maintaining the size of the yarn reserve at a command value.

20. Yarn supply apparatus according to claim 18, including a rotation reversal switch (60, 31) coupled to the drive motor;
and wherein a yarn tension monitor (22, 50) is provided, coupled with a drive motor, the tension monitor providing a signal which reverses the drive motor if the yarn tension drops below a predetermined threshold, said drive motor, under control of said signal, driving the supply element (5) to rewind the yarn until the predetermined yarn tension threshold has been attained.

* * * * *